(12) United States Patent
Mori et al.

(10) Patent No.: US 7,174,989 B2
(45) Date of Patent: Feb. 13, 2007

(54) ELECTRIC POWER STEERING APPARATUS

(75) Inventors: Sadaaki Mori, Mie (JP); Hideki Jonokuchi, Kashihara (JP); Hirohide Inayama, Yamatokoriyama (JP); Atsushi Ishihara, Headington (GB)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/091,711

(22) Filed: Mar. 5, 2002

(65) Prior Publication Data
US 2002/0125064 A1 Sep. 12, 2002

(30) Foreign Application Priority Data
Mar. 12, 2001 (JP) ............................. 2001-069117
Oct. 16, 2001 (JP) ............................. 2001-318584

(51) Int. Cl.
*B62D 5/04* (2006.01)
(52) U.S. Cl. ........................................ 180/446; 701/41
(58) Field of Classification Search ................ 180/443, 180/444, 446; 701/41, 42
See application file for complete search history.

(56) References Cited

U.S. PATENT DOCUMENTS

| | | | | |
|---|---|---|---|---|
| 5,257,828 A | * | 11/1993 | Miller et al. ................. | 180/446 |
| 5,568,389 A | * | 10/1996 | McLaughlin et al. .......... | 701/41 |
| 5,740,880 A | * | 4/1998 | Miller ......................... | 180/446 |
| 5,982,067 A | * | 11/1999 | Sebastian et al. ............ | 310/184 |
| 6,002,234 A | * | 12/1999 | Ohm et al. ................... | 318/729 |
| 6,124,688 A | * | 9/2000 | Coles et al. ................. | 318/254 |
| 6,351,050 B1 | * | 2/2002 | Coles ...................... | 310/156.53 |
| 6,373,211 B1 | * | 4/2002 | Henry et al. ................. | 318/432 |
| 6,422,335 B1 | * | 7/2002 | Miller ......................... | 180/446 |
| 6,427,104 B1 | * | 7/2002 | Matsushita et al. ........... | 701/41 |
| 6,499,559 B2 | * | 12/2002 | Mc Cann et al. ........... | 180/446 |

FOREIGN PATENT DOCUMENTS

| | | |
|---|---|---|
| EP | 1028047 | 8/2000 |
| EP | 1 139 557 | 10/2001 |
| JP | 8-331823 | 12/1996 |
| JP | 9-308286 | 11/1997 |
| JP | 10-94285 | 4/1998 |
| JP | 2000-184766 | 6/2000 |

OTHER PUBLICATIONS

Japanese Office Action mail May 17, 2005, for Japanese Patent Application No. 2000-318584 (w/ English translation).

* cited by examiner

*Primary Examiner*—Lesley D. Morris
*Assistant Examiner*—L. Lum
(74) *Attorney, Agent, or Firm*—Darby & Darby (57) ABSTRACT

The power steering apparatus comprises a torque sensor for detecting a steering torque applied to a steering wheel and a steering assist motor which is driven to rotate based on the detected steering torque. The motor is driven under field weakening control in a high-speed rotation area. The motor is a brushless motor comprising a rotor having a plurality of permanent magnets which are respectively fixed in a plurality of recesses provided in a rotor core. With the electric power steering apparatus, a steer-assisting force can be obtained in high-speed steering.

8 Claims, 11 Drawing Sheets

ELECTRIC POWER STEERING APPARATUS

BACKGROUND OF THE INVENTION

1. Field of the Invention

The present invention relates to improvement in an electric power steering apparatus comprising a torque sensor which detects a steering torque applied to a steering wheel and a steering assist motor which is driven to rotate based on the steering torque detected by the torque sensor.

2. Description of Related Art

An electric power steering is mounted on a vehicle so as to assist steering of the vehicle. The electric power steering apparatus has a steering mechanism which is connected with a steering wheel via a steering shaft. The steering mechanism is provided with a torque sensor for detecting a steering torque applied to the steering wheel and a motor for assisting operations of the steering mechanism. As the motor is driven in accordance with the steering torque detected by the torque sensor, a steering force which a driver needs to apply to the steering wheel is reduced.

In recent years, a brushless motor is frequently used as a steering assist motor for an electric power steering apparatus. The brushless motor comprises a rotor having a permanent magnet. The rotor is rotated as a circuit generates a rotating magnetic field on a stator in a controlled manner based on a detected signal corresponding to a position of the rotating rotor. A brushless motor without a brush does not generate mechanical or electric noise. Consequently, the brushless motor is widely used for apparatuses which require a motor with high performance in rotations and a long life, such as a cylinder in a VTR, a capstan in a cassette deck, a flexible disk drive unit and a CD player.

Figure 1:
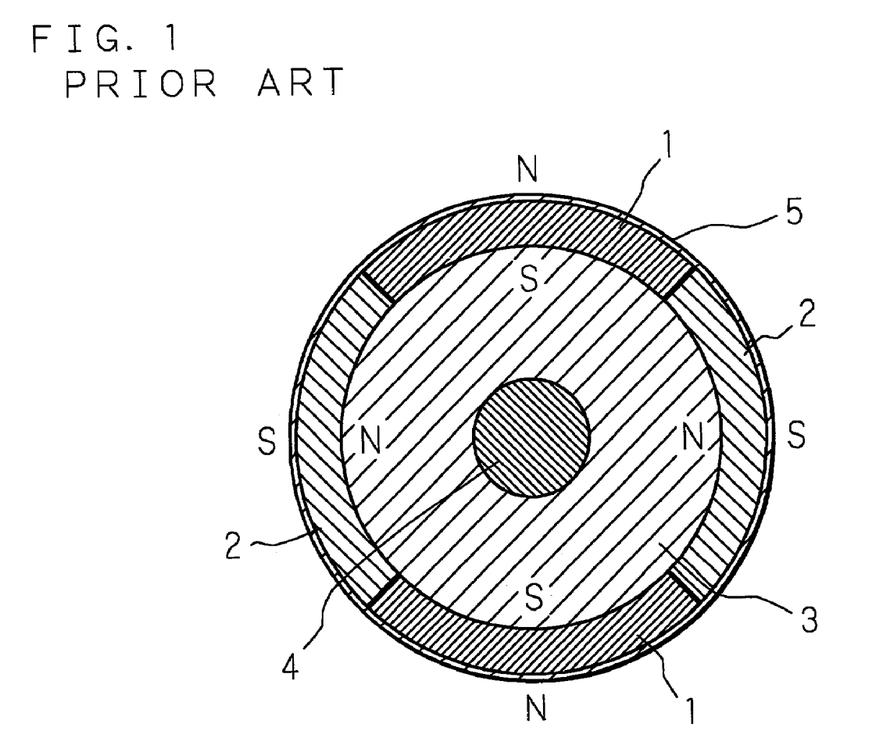
FIG. 1 is a transverse sectional view showing the structure of a rotor of a brushless motor configured as an SPM motor.

FIG. 1 is a transverse sectional view showing the structure of a rotor of a brushless motor configured as an SPM (Surface Permanent Magnet) motor which is used for a conventional electric power steering apparatus. The rotor has a rotor core 3 consisting of a plurality of laminated electromagnetic thin steel plates. Disposed through a center portion of the rotor core 3 is a shaft 4. The rotor further has four permanent magnets 1, 2, 1 and 2 which are attached to the rotor core 3 along a peripheral portion of the rotor core 3 in a manner that each magnet has a polarity different from that of an adjacent magnet. Each axial length of the four permanent magnets 1, 2, 1 and 2 is approximately equal to the length of the rotor core 3 in a direction of the lamination.

In the SPM motor, there is the possibility that one of the permanent magnets 1 and 2 breaks or comes off and scatters causing the motor to be locked. Consequently, to prevent scattering, the permanent magnets 1 and 2 at the peripheral portion of the rotor core 3 are covered with a cylinder 5 (a can) which is made of a thin stainless steel plate of non-magnetic material.

Figure 2:
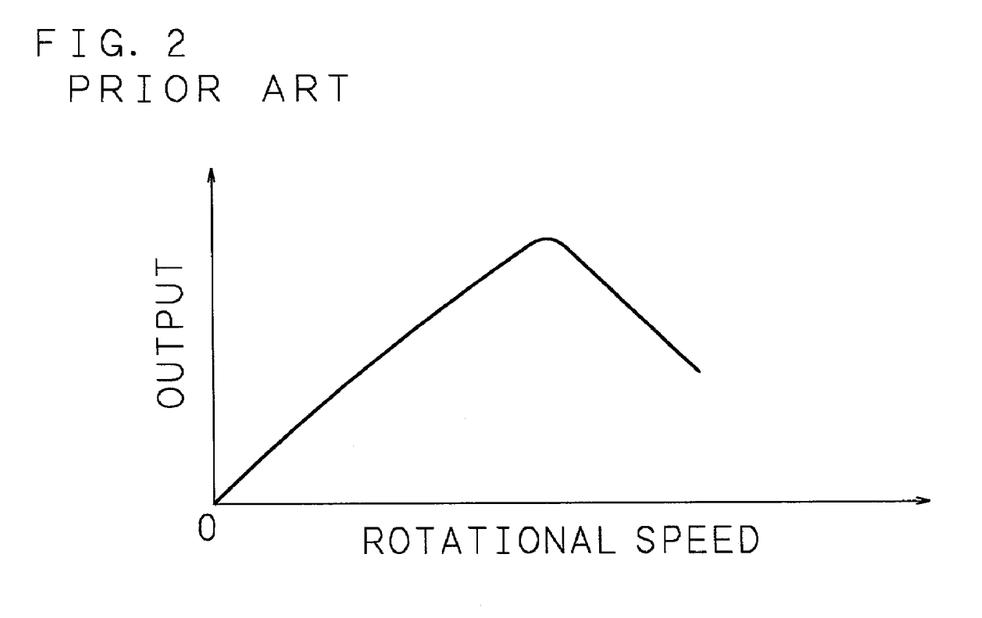
FIG. 2 is a view showing an output characteristic of the SPM motor.

A motor torque of the brushless motor configured as an SPM motor has an output characteristic as shown in FIG. 2, where an output (=torque * RPM (Revolutions Per Minute)) suddenly decreases in a high-speed rotation area. Consequently, when a brushless motor configured as an SPM motor is used as a steering assist motor for an electric power steering apparatus, a steer-assisting force cannot be obtained in high-speed steering and the steering operation becomes hard.

BRIEF SUMMARY OF THE INVENTION

The present invention has been made with the aim of solving the above problem, and it is an object thereof to provide an electric power steering apparatus with which a steer-assisting force can be obtained in high-speed steering.

The electric power steering apparatus according to the present invention comprises a torque sensor for detecting a steering torque applied to a steering wheel and a steering assist motor which is driven to rotate based on the steering torque detected by the torque sensor. The motor is a brushless motor (IPM (Interior Permanent Magnet) motor) comprising a rotor having a plurality of permanent magnets which are respectively fixed in a plurality of recesses provided in a rotor core. The rotor core consists of a plurality of electromagnetic thin steel plates which are laminated in the axial direction of a rotational axis. The recesses are formed so as to fit the shapes of the permanent magnets. With the electric power steering apparatus using the IPM motor, field weakening control can be performed which cannot be performed sufficiently with conventional SPM motors. The brushless motor is driven to rotate under field weakening control when a rotational speed thereof amounts to a predetermined range.

With the electric power steering apparatus, field weakening control enlarges the rotational speed range of the motor, and therefore, a steer-assisting force can be obtained even in a high-speed rotation area. Meanwhile, fixed in the plurality of recesses provided in the rotor core, the permanent magnets are kept from scattering. Consequently, the electric power steering apparatus can achieve high reliability without using protective material (a can). Furthermore, using a reluctance torque generated by magnetic saliency of the rotor, employment of the permanent magnets can be reduced, and therefore, costs for the components can be also reduced.

The brushless motor is put under field weakening control by controlling a phase of motor current which is controlled with a pulse signal controlled by PWM (Pulse Width Modulation). The predetermined range of rotational speed mentioned above is a range of rotational speed when an RMS (Root-Mean Square) value of an alternating signal corresponding to the pulse signal is within a range of 90% to 100% of the maximum RMS value, and besides, pulse control is not performed.

The electric power steering apparatus according to the invention comprises: means for detecting a ratio of the RMS value to the maximum value; means for judging whether the detected ratio is within a range of 90% to 100%; and means for switching on/off phase control. When the detected ratio is within a range of 90% to 100%, a phase of motor current is controlled by controlling a phase of the pulse signal.

As phase control (field weakening control) is performed when the ratio is within a range of 90% to 100%, i.e. when a rotational speed of the motor is in a high-speed rotation area close to the maximum speed, the rotational speed range of the motor is enlarged. As a result, a steer-assisting force can be obtained even in an area of rotational speed which is higher than the above maximum speed.

The electric power steering apparatus according to the invention comprises: a table which includes correlation between the steering torque and a target value of the motor current; and means for calculating a difference between the detected steering torque and a preset threshold. When the detected ratio is under 90%, the pulse signal is PWM-controlled based on a target value of motor current calculated with the table. When the detected ratio is within a range of 90% to 100%, a difference between the detected steering torque and a preset threshold is calculated and the phase of the pulse signal is controlled so as to the decrease the calculated difference.

With the electric power steering apparatus, the phase control (field weakening control) enlarges the rotational speed range of the motor, and therefore, a difference between the steering torque and the preset threshold can be decreased. Moreover, by decreasing a difference between the steering torque and the preset threshold which is generated when a steering speed exceeds the speed of response of the motor, steering response can be enhanced.

The above and further objects and features of the invention will more fully be apparent from the following detailed description with accompanying drawings.

DETAILED DESCRIPTION OF THE INVENTION

The following description will explain the present invention with reference to the drawings illustrating an embodiment thereof.

Figure 3:
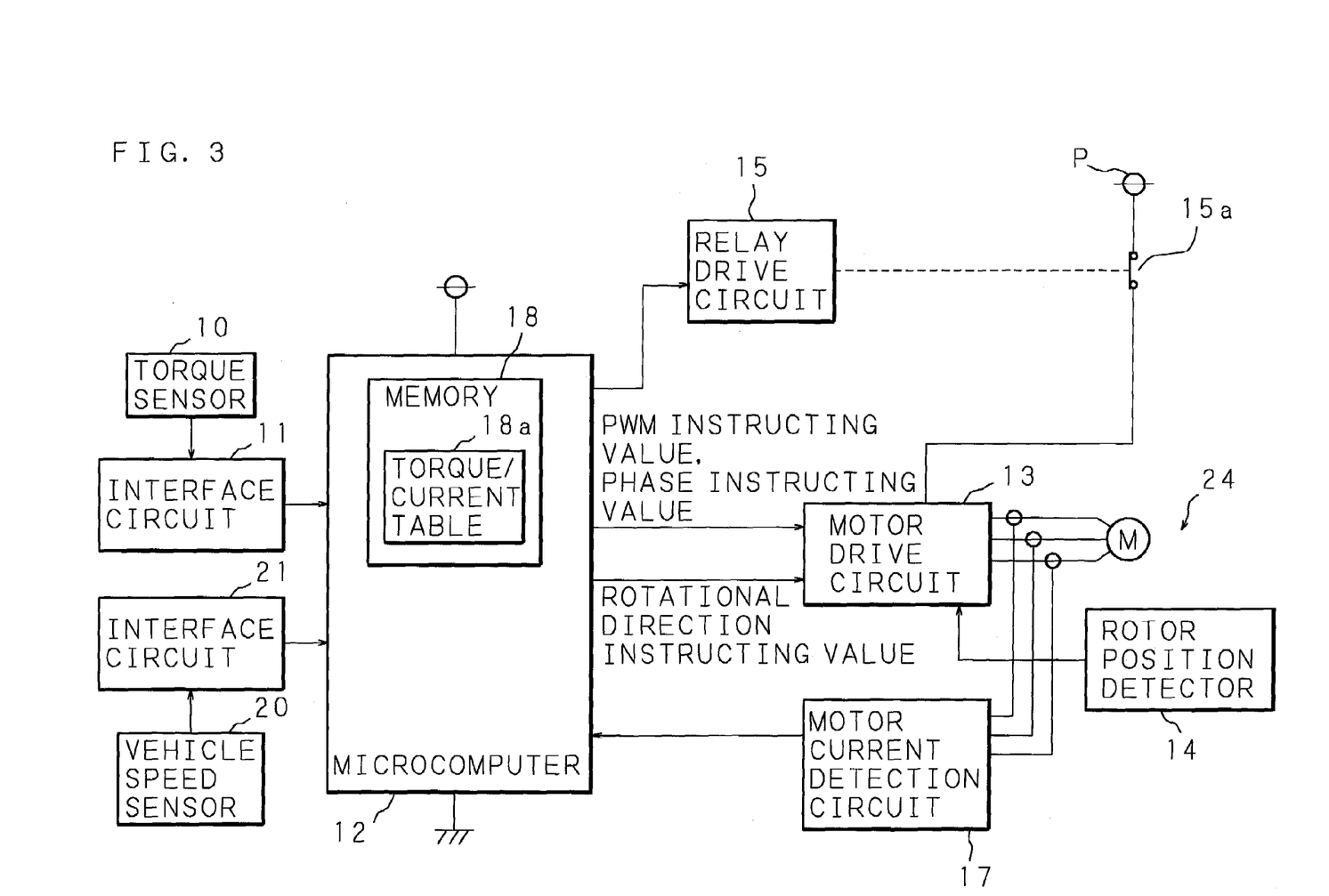
FIG. 3 is a block diagram showing the structure of an essential part of an embodiment of the electric power steering apparatus according to the present invention.

FIG. 3 is a block diagram showing the structure of an essential part of an embodiment of the electric power steering apparatus according to the present invention. A torque applied to a steering shaft (not shown) is detected by a torque sensor 10. A torque detection signal outputted from the torque sensor 10 is supplied to a microcomputer 12 via an interface circuit 11. A vehicle speed is detected by a vehicle speed sensor 20. A vehicle speed signal outputted from the vehicle speed sensor 20 is supplied to the microcomputer 12 via an interface circuit 21.

A relay control signal outputted from the microcomputer 12 is inputted to a relay drive circuit 15. The relay drive circuit 15 switches on or off a fail-safe relay contact 15a in accordance with the inputted relay control signal.

The microcomputer 12 creates a motor current instructing value (a PWM instructing value) and a rotational direction instructing signal based on the torque detection signal, the vehicle speed signal and a motor current signal which will be described hereinafter. To create the PWM instructing value and the rotational direction instructing value, the microcomputer 12 refers to a torque/current (target motor current) table 18a in a memory 18. Thus created PWM instructing value and the rotational direction instructing value are supplied to a motor drive circuit 13. To the motor drive circuit 13, a supply voltage is applied from a mounted battery P via the fail-safe relay contact 15a. Based on the supplied PWM instructing value and rotational direction instructing value, the motor drive circuit 13 drives a brushless motor 24, which serves as a steering assist motor, to rotate.

When the brushless motor 24 rotates, a rotor position detector 14 detects a position of a rotor of the brushless motor 24. The rotations of the brushless motor 24 is controlled by the motor drive circuit 13, based on a detected signal indicative of the rotor position.

A motor current which flows in the brushless motor 24 is detected by a motor current detection circuit 17. A motor current signal corresponding to the detected motor current is supplied to the microcomputer 12.

Figure 4:
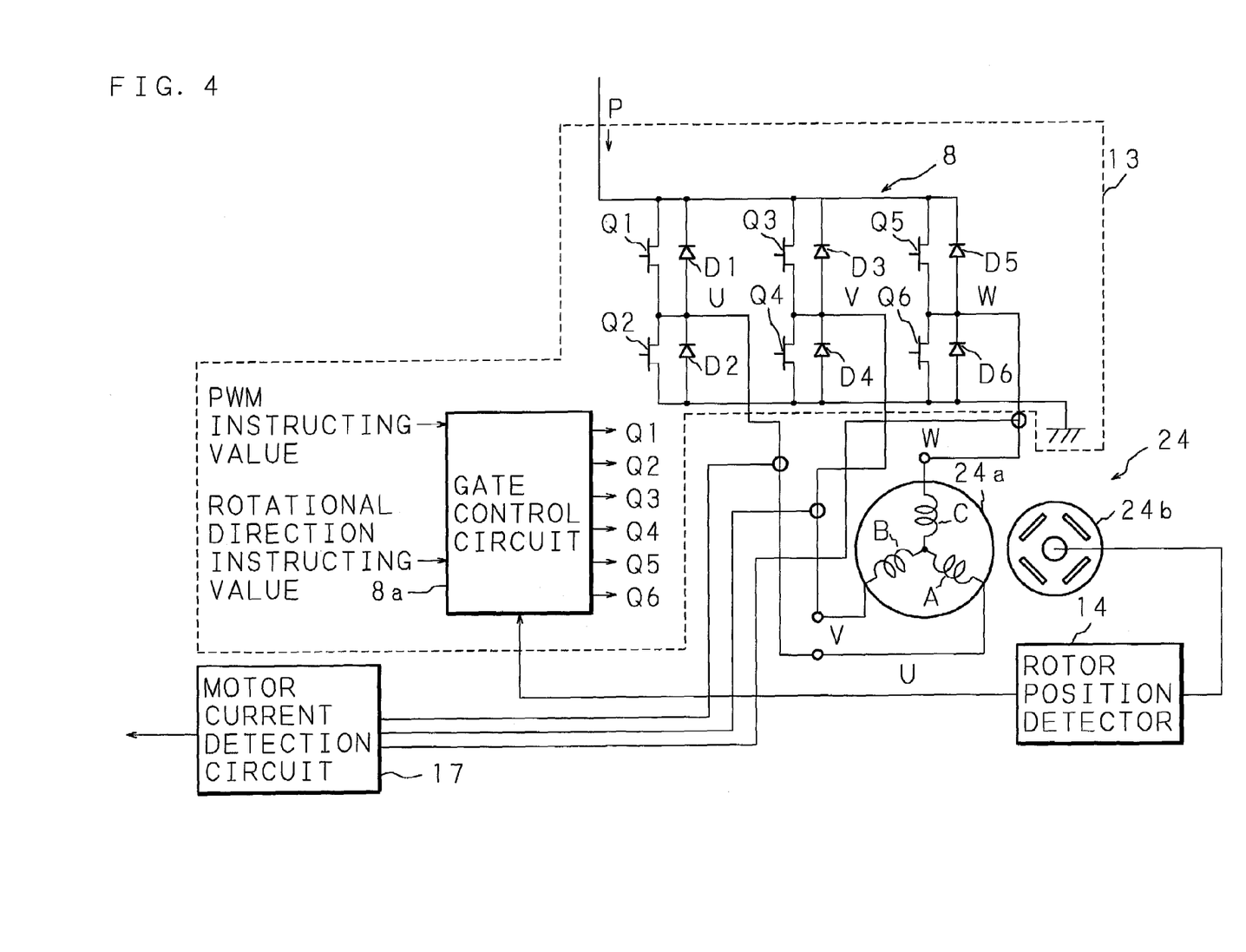
FIG. 4 is a block diagram showing the structure of a brushless motor, a motor drive circuit and a motor current detection circuit.

FIG. 4 is a block diagram showing the structure of the brushless motor 24, the motor drive circuit 13 and the motor current detection circuit 17. The brushless motor 24 comprises: a stator 24a having coils A, B and C which are connected in a star connection at one terminal of each thereof; a rotor 24b which rotates in a rotating magnetic field generated by the coils A, B and C; and a rotor position detector 14 (a resolver) for detecting a position of the rotating rotor 24b.

The motor drive circuit 13 comprises a switching circuit 8. In the switching circuit 8, transistors Q1 and Q2 connected in series between a positive terminal and an earthing terminal are connected in parallel with diodes D1 and D2 which are connected in series in a reverse direction. Transistors Q3 and Q4 connected in series are connected in parallel with diodes D3 and D4 which are connected in series in a reverse direction. Transistors Q5 and Q6 connected in series are connected in parallel with diodes D5 and D6 which are connected in series in a reverse direction.

Connected to a nodal point of common connection of the transistors Q1 and Q2 and a nodal point of common connection of the diodes D1 and D2 is a terminal U of the coil A, the other terminal of which is in the star connection. Connected to a nodal point of common connection of the transistors Q3 and Q4 and a nodal point of common connection of the diodes D3 and D4 is a terminal V of the coil B, the other terminal of which is in the star connection. Connected to a nodal point of common connection of the transistors Q5 and Q6 and a nodal point of common connection of the diodes D5 and D6 is a terminal W of the coil C, the other terminal of which is in the star connection.

The position of the rotating rotor 24b, which is detected by the rotor position detector 14, is posted to a gate control circuit 8a. To the gate control circuit 8a, a PWM instructing value (a motor current instructing value) and a rotational direction instructing value are supplied by the microcomputer 12. The gate control circuit 8a switches on/off each gate of the transistors Q1 through Q6 in accordance with the instruction on a rotational direction and a position of the rotating rotor 24b. A rotating magnetic field is generated by switching a path of a current flowing in the rotor 24b, for example, in order of U-V, V-W, W-U, U-V, V-W and W-U.

The rotor 24b, which comprises permanent magnets, is rotated by a rotational force generated by the rotating magnetic field. In the gate control circuit 8a, switching on/off of the transistors Q1 through Q6 is PWM (Pulse Width Modulation)-controlled in accordance with the supplied PWM instructing value. The PWM control enables control of the magnitude of a rotation torque in the brushless motor 24.

The diodes D1 through D6 have a function of absorbing noise generated in switching on/off the transistors Q1 through Q6.

The motor current detection circuit 17 detects and sums up a current flowing in each of the terminals U, V and W of the brushless motor 24. A motor current signal corresponding to the calculated motor current value is supplied to the microcomputer 12.

Figure 5:
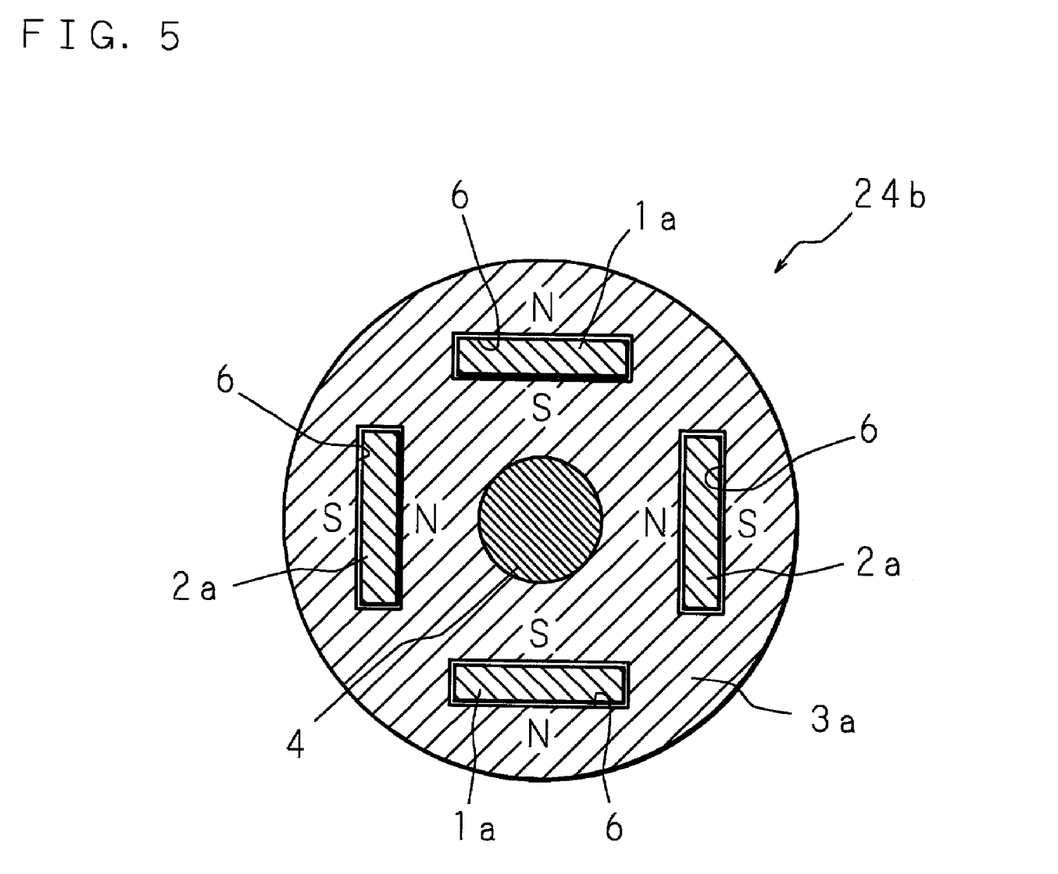
FIG. 5 is a transverse sectional view showing the structure of a rotor of a brushless motor configured as an IPM motor.

FIG. 5 is a transverse sectional view showing the structure of the rotor 24b of the brushless motor 24 configured as an IPM (Internal Permanent Magnet) motor. Disposed through a center portion of the rotor 24b is a shaft 4. A rotor core 3a of the rotor 24b is formed of a plurality of laminated electromagnetic thin steel plates. In the rotor core 3a, four recesses 6 of rectangular parallelepipeds for building plate permanent magnets 1a and 2a therein are provided so as to fit the shapes of the permanent magnets 1a and 2a, surrounding the shaft 4. The four permanent magnets 1a and 2a are fixed in each recess 6 in a manner that each magnet has a polarity different from that of an adjacent magnet. Each axial length of the plate permanent magnets is approximately equal to the length of the rotor core 3a in a direction of the lamination.

The shapes of the permanent magnets are not limited to flat plates and may be circular. The number of polarities is not limited to four, and may be another even number such as six, eight, twelve and the like.

Figure 6:
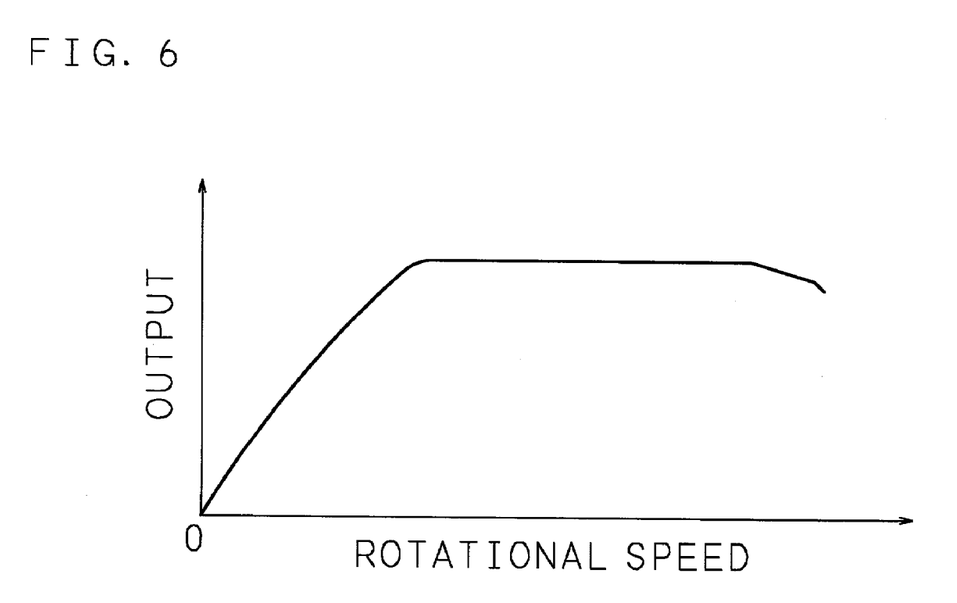
FIG. 6 is a view showing an output characteristic of the brushless motor configured as an IPM motor.

A motor torque of the brushless motor 24 configured as an IPM motor having such a rotor 24b has an output characteristic as shown in FIG. 6 (under field weakening control). With the brushless motor 24, field weakening control can be performed under which an output (=torque * RPM (Revolutions Per Minute)) doesn't decrease even in a high-speed rotation area. Consequently, with the electric power steering apparatus according to the present invention, a steer-assisting force can be obtained in high-speed steering. Field weakening control is achieved by controlling the phase of the motor current. The phase control of the motor current is performed by controlling the phase of the pulse signal which is PWM-controlled. As the motor drive circuit 13 is supplied with the pulse signal which is PWM-controlled in accordance with the motor current instructing value (PWM instructing value) and phase-controlled in accordance with the phase instructing value, the motor current value and the phase can be controlled.

Figure 7A:
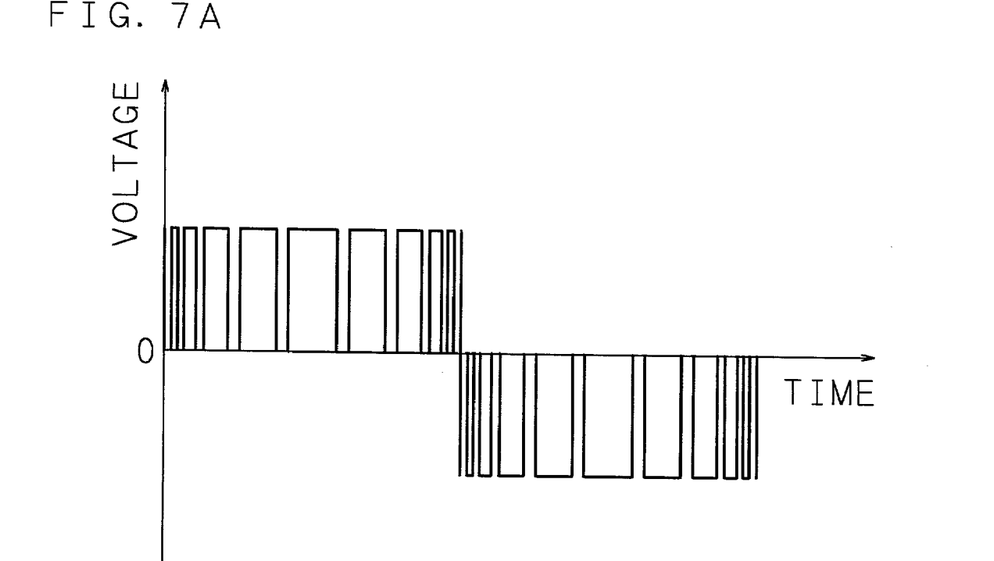
FIG. 7A is a view showing an example of a pulse signal.
Figure 7B:
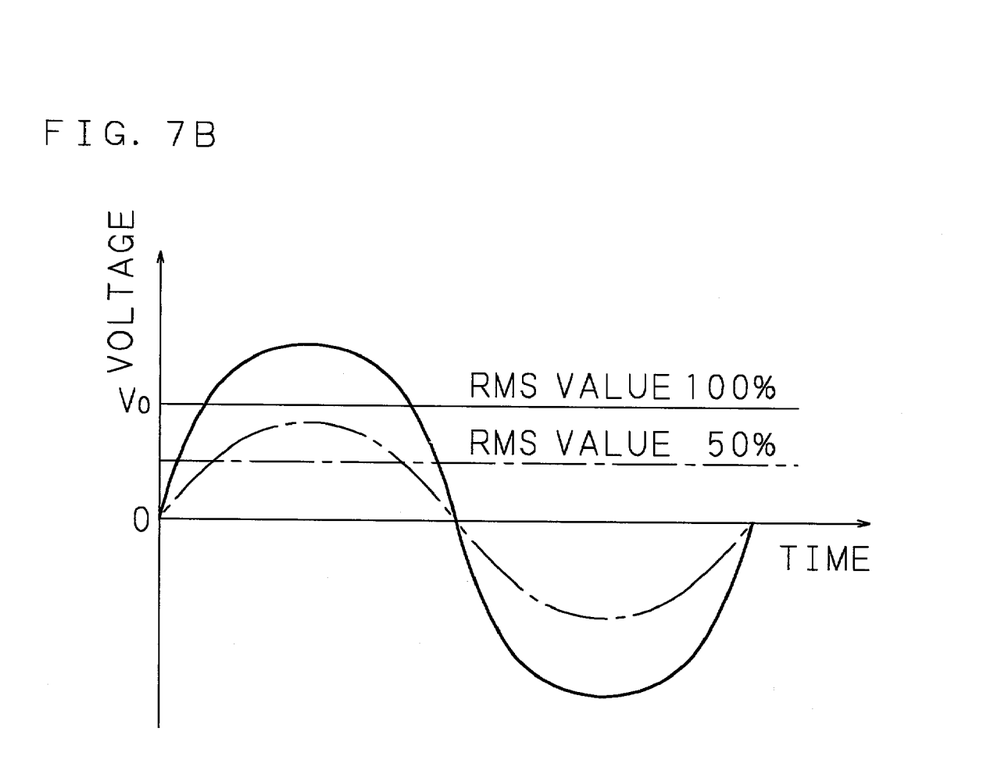
FIG. 7B is a view showing an example of an alternating signal corresponding to the pulse signal.

FIG. 7A shows an example of a pulse signal. FIG. 7B shows an example of an alternating signal corresponding to the pulse signal shown in FIG. 7A. As shown in FIG. 7B, an RMS (Root-Mean Square) value of the alternating signal changes in accordance with a change of the width of the pulse signal, i.e., the RMS value of the alternating signal changes in accordance with the motor current. In the following explanation, the maximum RMS value ($V_0$) of the alternating signal is represented as 100%, and an RMS value with a half magnitude of the maximum value ($V_0$) is represented as 50%.

Figure 8A:
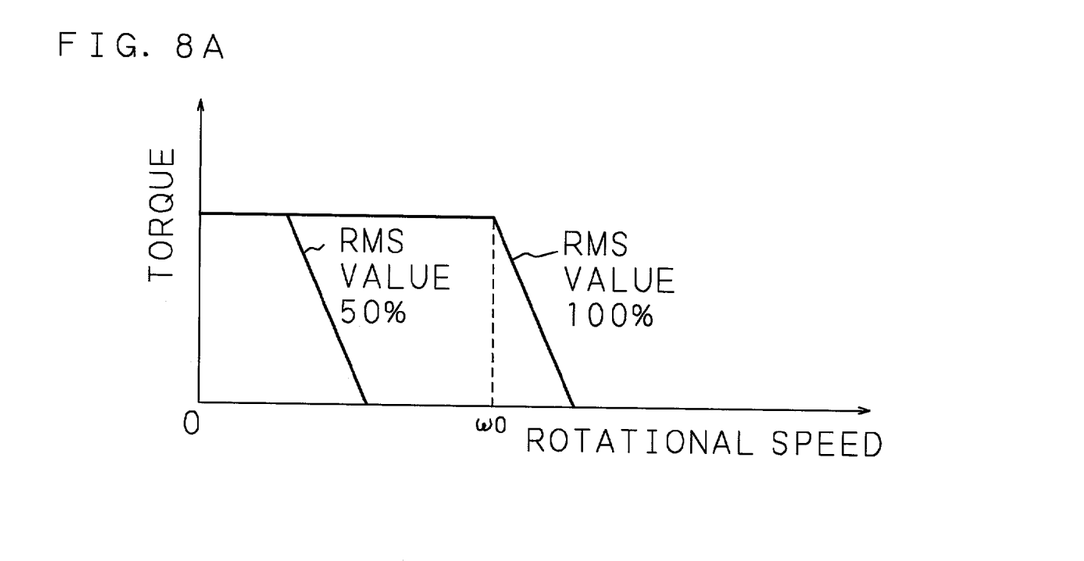
FIG. 8A is a view of a torque characteristic of the brushless motor configured as an IPM motor, shown when field weakening control is not performed.
Figure 8B:
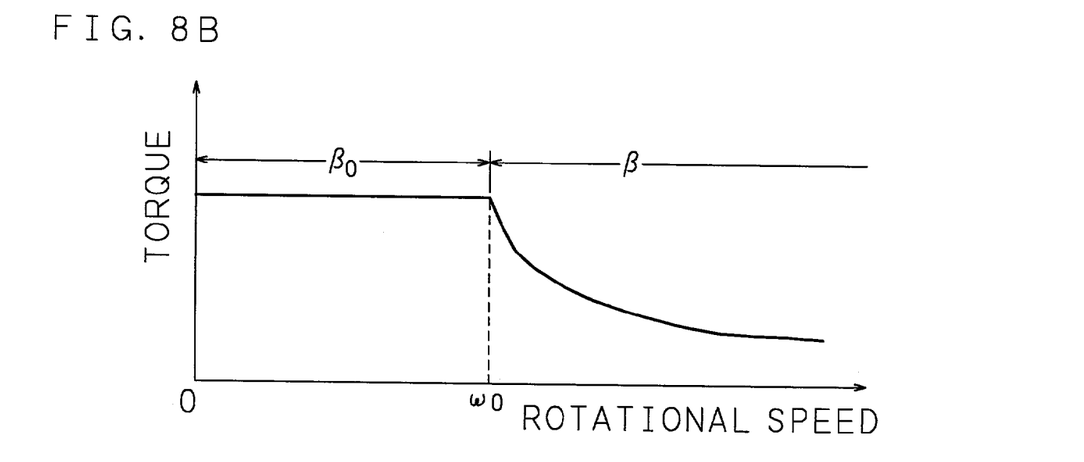
FIG. 8B is a view of a torque characteristic of the brushless motor configured as an IPM motor, shown when field weakening control is performed.

The field weakening control enlarges the rotational speed range of the motor, and therefore, a steer-assisting force can be obtained even in a high-speed rotation area. When field weakening control is not performed, a torque is decreased with a rise of a rotational speed and the rotational speed comes to a maximum rotational speed, as shown in FIG. 8A, after the rotational speed exceeds $\omega_0$ at which an RMS value of the alternating signal corresponding to the pulse signal is 100% and the torque begins to fall from the maximum value. When field weakening control is performed, as shown in FIG. 8B, rotational speed can be increased even after exceeding $\omega_0$.

The microcomputer 12 drives the brushless motor 24 in a PWM-controlled manner when the RMS value of the alternating signal is under 100%. When the RMS value is 100%, the microcomputer 12 causes the phase of the motor current to lead so that the brushless motor 24 is driven under field weakening control. The microcomputer 12 operates as means for detecting an RMS value, means for judging whether the detected RMS value is 100% or not and means for switching on/off the field weakening control.

In this embodiment, the microcomputer 12 causes the phase of the motor current to lead when an RMS value is 100%, and besides, a steering speed is over the speed of response of the motor. When an RMS value is 100%, and besides, a steering torque is under a preset threshold, the microcomputer 12 causes the phase of the motor current to lag so that a maximum torque is outputted. When the motor current amounts to a limiting value, the microcomputer 12 stops execution of field weakening control.

Figure 9:
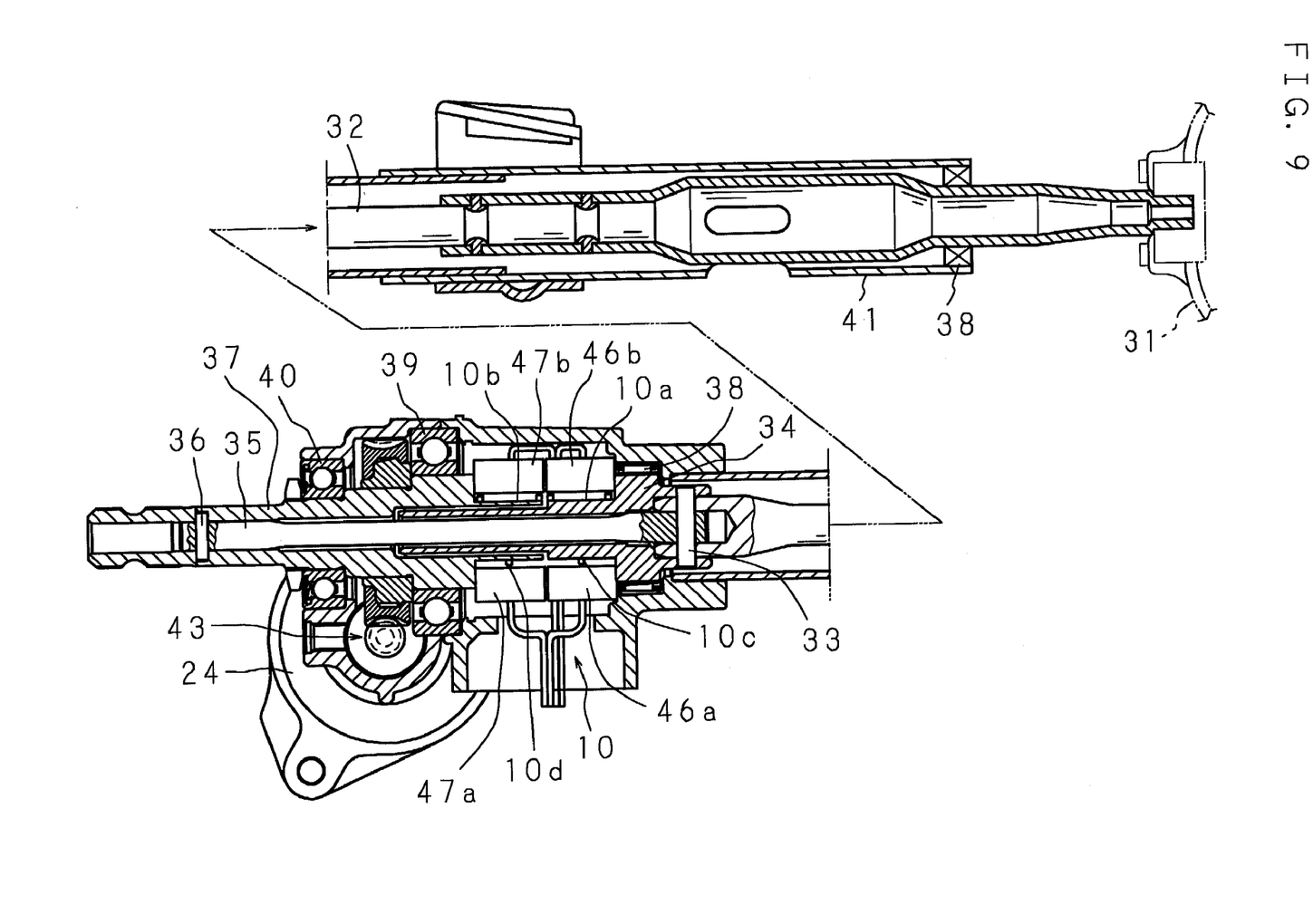
FIG. 9 is a longitudinal sectional view showing the structure of an essential part of an embodiment of the electric power steering apparatus according to the present invention.

FIG. 9 is a longitudinal sectional view showing the structure of an essential part of an embodiment of the electric power steering apparatus according to the present invention. The electric power steering apparatus comprises an upper shaft 32, to an upper end portion of which a steering wheel 31 is attached. Connected to a lower end portion of the upper shaft 32 through a first dowel pin 33 are a cylindrical input shaft 34 and an upper end portion of a connection shaft 35 (a torsion bar) which is inserted into the input shaft 34. To a lower end portion of the connection shaft 35, a cylindrical output shaft 37 is connected via a second dowel pin 36. The upper shaft 32, the input shaft 34 and the output shaft 37 are supported in a housing 41 so as to be rotatable, respectively via bearings 38, 39 and 40.

The housing 41 houses: a torque sensor 10 for detecting a steering torque based on relative displacement between the input shaft 34 and the output shaft 37 which are connected with each other via the connection shaft 35; and a reduction mechanism 43 for reducing the rotation of the steering assist brushless motor 24 which is driven based on the result detected by the torque sensor 10 and transmitting the reduced rotation to the output shaft 37. The rotation of the brushless motor 24 assists operations of the steering mechanism in accordance with rotation of the steering wheel 31, and therefore, driver's load in steering can be reduced. To a lower end portion of the output shaft 37, a steering mechanism of a rack-and-pinion type is connected via a universal joint.

The torque sensor 10 is provided with a plurality of protrusions 10c made of magnetic material, which are formed along a circumferential surface 10a of the input shaft 34 at an incline with regard to the axial direction of the input shaft 34. For detecting the positions of the protrusions 10c made of magnetic material, which moves in an axial direction of the input shaft 34 with rotation of the input shaft 34, an MR sensor 46a (a magneto resistance effect element, a first magneto metric sensor) and an MR sensor 46b (a second magneto metric sensor) are provided in parallel, with an appropriate space from the input shaft 34. The MR sensors 46a and 46b are fixed respectively at immovable portions of the car body, more particularly, at positions which are apart from each other by 180° in a peripheral direction of the input shaft 34.

Similarly to the input shaft 34, the output shaft 37 is provided with a plurality of protrusions 10*d* made of magnetic material, which is formed along a circumferential surface 10*b* of the output shaft 37 at an incline with regard to the axial direction of the output shaft 37. For detecting the positions of the protrusions 10*d* made of magnetic material, which moves in an axial direction of the output shaft 37 with rotation of the output shaft 37, an MR sensor 47*a* (a magneto resistance effect element, a first magneto metric sensor) and an MR sensor 47*b* (a second magneto metric sensor) are provided in parallel, with an appropriate space from the output shaft 37. The MR sensors 47*a* and 47*b* are fixed respectively at immovable portions of the car body, more particularly, at positions which are apart from each other by 180° in a peripheral direction of the output shaft 37.

Figure 10:
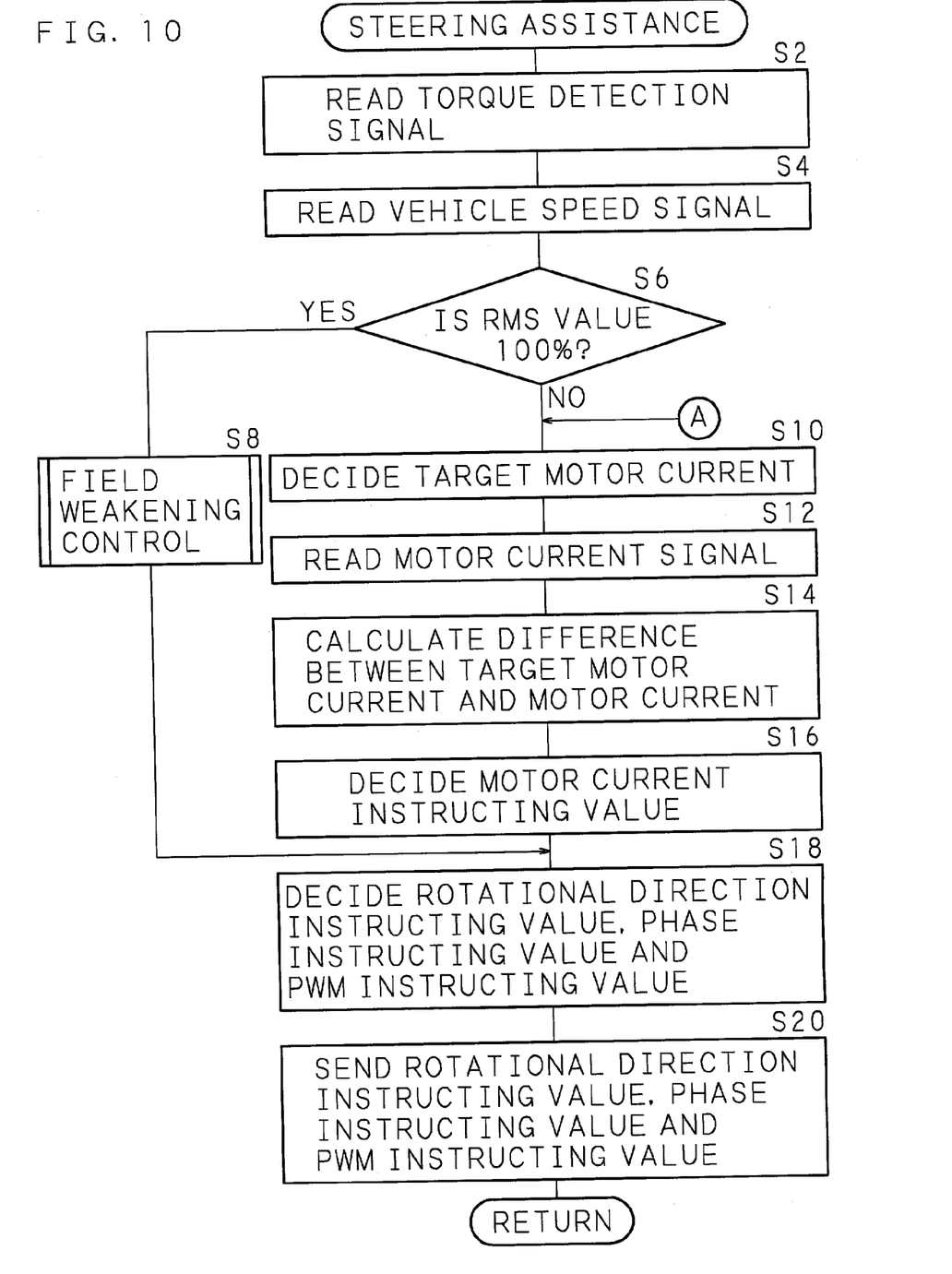
FIGS. 10 and 11 are flowcharts showing operations of the electric power steering apparatus according to the present invention.

The following description will explain the operations of the electric power steering apparatus constructed as above, with reference to a flowchart in FIG. 10 illustrating the same.

Fist in steer-assisting operations, the microcomputer 12 reads a torque detection signal detected by the torque sensor 10 via the interface circuit 11 (step S2), and then, reads a vehicle speed signal detected by the vehicle speed sensor 20 via the interface circuit 21 (step S4).

The microcomputer 12 judges whether an RMS value of an alternating signal, which corresponds to a pulse signal of a PWM instructing value supplied to the motor drive circuit 13, is 100% or not (step S6). When the RMS value is under 100% (step S6: NO), a target motor current is decided based on the read (step S4) vehicle speed signal and the read (step S2) torque detection signal, with reference to the torque/current table 18*a* (step S10).

Next, the microcomputer 12 reads a motor current signal from the motor current detection circuit 17 (step S12). The microcomputer 12 calculates a difference between the decided target motor current (step S10) and the read (step S12) motor current signal (step S14). Based on the calculated difference, a motor current instructing value is decided so that the target motor current flows in the brushless motor 24 (step S16).

Figure 11:
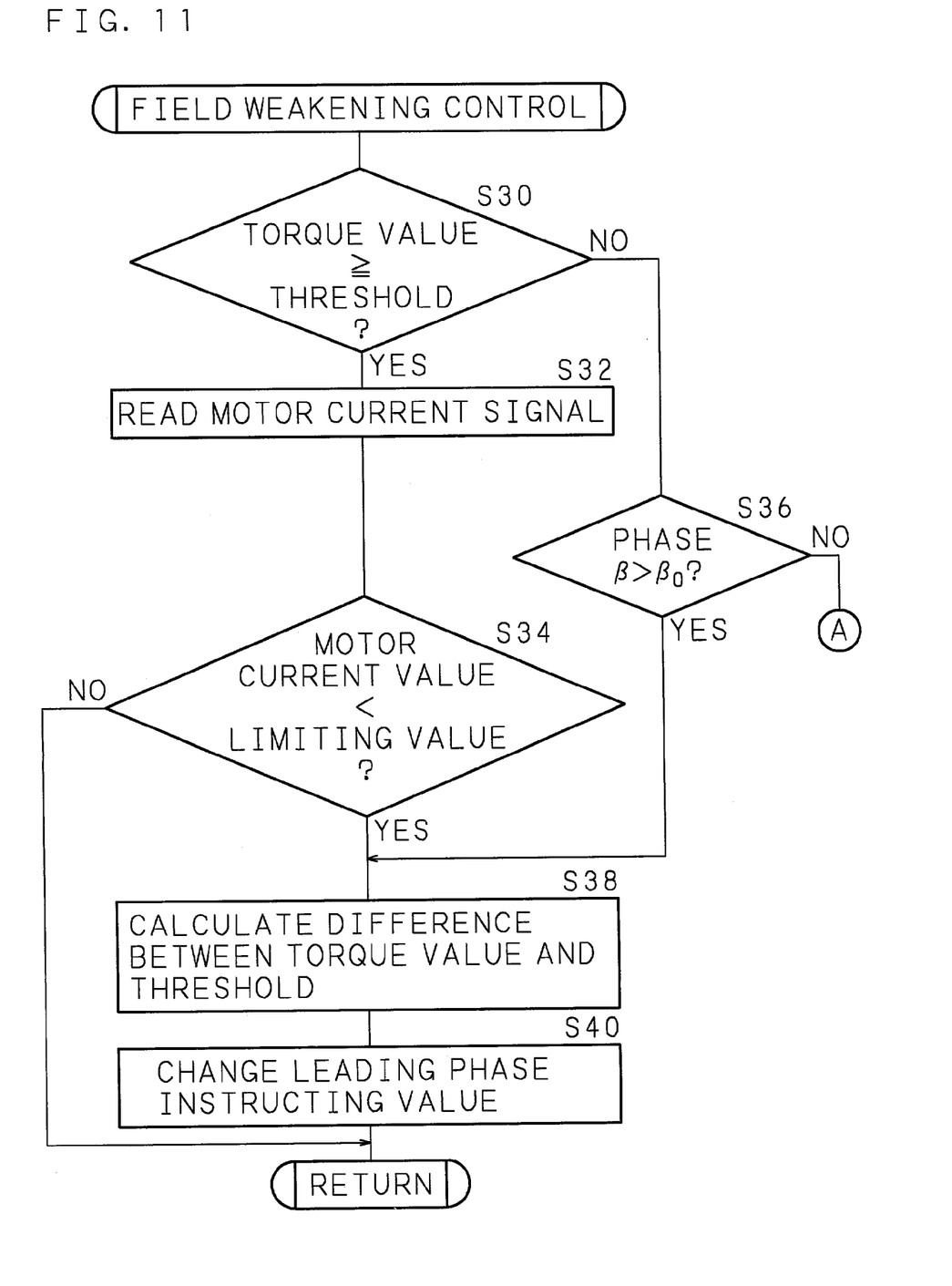

When the RMS value is 100% (step S6: YES), field weakening control is performed (step S8). The sequence of processing of field weakening control is shown in FIG. 11. The microcomputer 12 compares the detected torque value with a threshold (step S30). The threshold is a steering torque value which is used for judging whether a steering speed exceeds the speed of response of the motor or not, and is stored in advance in the memory 18 of the microcomputer 12. When the torque value is under the threshold (step S30: NO), a phase $\beta$ of the motor current is compared with a phase $\beta_0$ corresponding to the maximum torque (step S36). When the phase P is leading with regard to the phase $\beta_0$ (step S36: YES), the microcomputer 12 calculates a difference between the torque value and the threshold (step S38). A leading phase instructing value is changed so as to decrease the difference (step S40), and the program is returned. When the phase $\beta$ and the phase $\beta_0$ are equal to each other (step S36: NO), the microcomputer 12 decides the target motor current (step S10), reads the motor current signal (step S12), calculates a difference between the target motor current and the motor current (step S14) and decides the motor current instructing value (step S16) as described above.

When the torque value is equal to or over the threshold (step S30: YES), the microcomputer 12 reads a motor current signal (step S32) and judges whether the motor current signal is under the limiting value (step S34). When the motor current is under the limiting value (step S34: YES), a difference between the torque value and the threshold is calculated (step S38). A leading phase instructing value is changed so as to decrease the difference (step S40), and the program is returned. When the motor current comes up to the limiting value (step S34: NO), the program is returned.

In accordance with the decided (step S16) motor current instructing value or the changed (step S40) leading phase instructing value, the microcomputer 12 decides a PWM instructing value, a phase instructing value and a rotational direction instructing value (step S18). The PWM instructing value, a phase instructing value and the rotational direction instructing value (a pulse signal, a rotational direction instructing signal) decided at the microcomputer 12 are supplied to the motor drive circuit 13 (step S20). The program is then returned, and the microcomputer 12 starts another processing.

The motor drive circuit 13 drives the brushless motor 24 to rotate, based on the supplied PWM instructing value, phase instructing value and rotational direction instructing value (pulse signal, rotational direction instructing signal). As a result, as shown in FIG. 8B, the brushless motor 24 is phase-controlled by the phase $\beta_0$ under the rotational speed $\omega_0$. When a rotational speed exceeds $\omega_0$, the brushless motor 24 is phase-controlled by a phase $\beta$ ($\beta_0>\beta$), and the phase $\beta$ gradually rises with a rise of the rotational speed.

Although, in the above embodiment, whether a rotational speed is within a high-speed rotation area or not is judged based on the RMS value of the alternating signal corresponding to the pulse signal, this is not limiting. Whether a rotational speed is within a high-speed rotation area may be judged based on the rotational speed $\omega_0$ shown in FIG. 8B. Providing a steering angular speed sensor at the input shaft, whether a rotational speed is within a high-speed rotation area may also be judged based on a detected steering angular speed.

Moreover, the electric power steering apparatus may have a table in which a phase corresponding to a torque and an RPM of the motor is stored in advance. With such an electric power steering apparatus, phase control (field weakening control) can be performed based on a phase read from the table in accordance with a detected torque value and a detected RPM of the motor. Furthermore, an RMS value used as a reference for phase control may be a value between 90% and 100%, though the above embodiment employed 100% as the reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electric power steering apparatus comprising:
   a torque sensor for detecting a steering torque applied to a steering wheel;
   a steering assist motor which is driven to rotate based on the steering torque detected by the torque sensor;
   a drive circuit for driving the motor to rotate;
   a judgment unit for judging whether a rotational speed of the motor is within a predetermined range; and
   an instruction unit for supplying an instructing signal for field weakening control of the motor to the drive circuit, when it is judged that the rotational speed of the motor is within the predetermined range,
wherein the motor is a brushless motor comprising a rotor having a plurality of permanent magnets which are respectively fixed in a plurality of recesses provided in a rotor core;
wherein the brushless motor is set under field weakening control by controlling a phase of a motor current which is controlled with a PWM-controlled pulse signal which corresponds to a root-mean square value of an alternating signal,
wherein the predetermined range is a rotational speed range where a root-mean square value of the alternating signal corresponding to the pulse signal is within a range of 90% through 100% of a maximum root-mean square value and where phase control is not performed.

2. The electric power steering apparatus according to claim 1, wherein the rotor core is made of a plurality of electromagnetic thin steel plates which are laminated in an axial direction of a rotational axis so that the recesses fit shapes of the permanent magnets.

3. The electric power steering apparatus according to claim 1, further comprising:
a detector for detecting a ratio of the root-mean square value to the maximum value;
a judgment unit for judging whether the detected ratio is within a range of 90% through 100%; and
a switching unit for switching on/off phase control,
wherein a phase of the motor current is controlled by controlling a phase of the pulse signal, when the detected ratio is within a range of 90% through 100%.

4. The electric power steering apparatus according to claim 3, further comprising:
a table which includes correlation between the steering torque and a target value of the motor current; and
a calculator for calculating a difference between the detected steering torque and a preset threshold,
wherein the pulse signal is PWM-controlled based on a target value obtained with the table, when the detected ratio is under 90%, and
the difference is calculated and a phase of the pulse signal is controlled so as to decrease the difference, when the detected ratio is within a range of 90% through 100%.

5. An electric power steering apparatus comprising:
a torque sensor for detecting a steering torque applied to a steering wheel;
a steering assist motor which is driven to rotate based on the steering torque detected by the torque sensor;
a drive circuit for driving the motor to rotate;
means for judging whether a rotational speed of the motor is within a predetermined range; and
means for supplying an instructing signal for field weakening control of the motor to the drive circuit, when it is judged that the rotational speed of the motor is within the predetermined range,
wherein the motor is a brushless motor comprising a rotor having a plurality of permanent magnets which are respectively fixed in a plurality of recesses provided in a rotor core, the brushless motor being set under the field weakening control by controlling a phase of a motor current which is controlled with a PWM-controlled pulsed signal which corresponds to a root-mean square value of an alternating signal;
wherein the predetermined range is a rotational speed range where a root-mean square value of the alternating signal corresponding to the pulse signal is within a range of 90% through 100% of a maximum root-mean square value and where phase control is not performed.

6. The electric power steering apparatus according to claim 5, wherein the rotor core is made of a plurality of electromagnetic thin steel plates which are laminated in an axial direction of a rotational axis so that the recesses fit shapes of the permanent magnets.

7. The electric power steering apparatus according to claim 5, further comprising:
means for detecting a ratio of the root-mean square value to the maximum value;
means for judging whether the detected ratio is within a range of 90% through 100%; and
means for switching on/off phase control, wherein a phase of the motor current is controlled by controlling a phase of the pulse signal, when the detected ratio is within a range of 90% through 100%.

8. The electric power steeling apparatus according to claim 7, further comprising:
a table which includes correlation between the steering torque and a target value of the motor current; and
means for calculating a difference between the detected steering torque and a preset threshold,
wherein the pulse signal is PWM-controlled based on a target value obtained with the table, when the detected ratio is under 90%, and
the difference is calculated and a phase of the pulse signal is controlled so as to decrease the difference, when the detected ratio is within a range of 90% through 100%.

* * * * *